Aug. 15, 1950  E. A. SNOW  2,518,728
GAUGE FOR CUTOFF SAWS
Filed Feb. 28, 1947
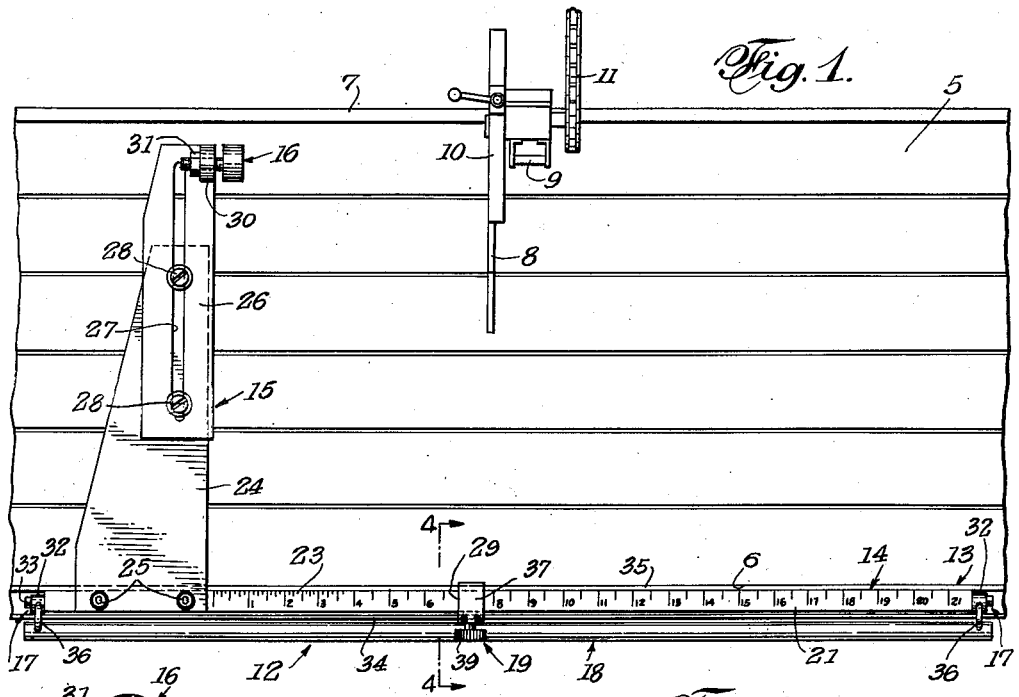
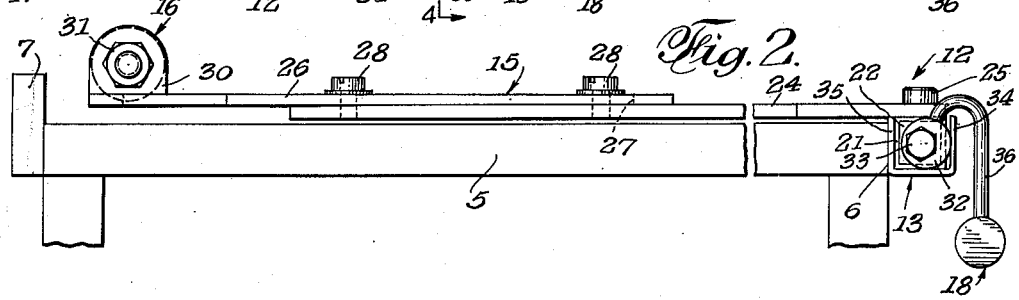
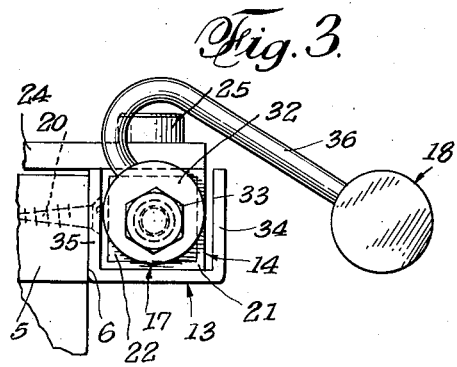
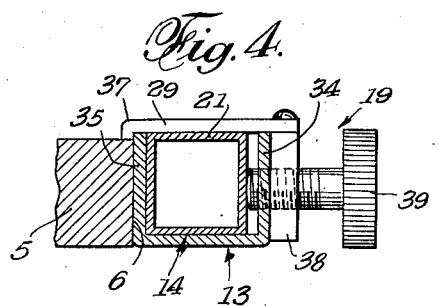
INVENTOR.
EUGENE A. SNOW
BY C. G. Stratton
ATTORNEY Patented Aug. 15, 1950

2,518,728

UNITED STATES PATENT OFFICE 2,518,728

GAUGE FOR CUTOFF SAWS

Eugene A. Snow, Lynwood, Calif.

Application February 28, 1947, Serial No. 731,646

7 Claims. (Cl. 143—174)

This invention relates to a gauge for cut-off saws and deals with gauge means more particularly adapted to be applied to an existing saw table to gauge the cut-off length of elongated members.

An object of the present invention is to provide an improved gauge structure which is of simple crankless construction whereby the gauge stop is readily and accurately adjusted, with respect to the cutting element of a saw table, from any position along the front of the table.

Another object of the invention is to provide a gauge structure devoid of expensive machined parts, in that gears, wheels and other necessarily accurate elements are omitted and which is readily adjusted to gauging position with relation to a cut-off saw by a simple sliding adjustment longitudinally of the table bearing the gauge structure.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

This application is an improvement of my Patent Number 2,498,865.

Fig. 1 is a broken plan view of a cut-off saw table equipped with an adjustable gauge embodying the present invention.

Fig. 2 is a broken enlarged end view as seen from the left of Fig. 1.

Fig. 3 is a further enlarged fragmentary view of the left end of the gauge showing the manner of effecting release of the same for adjustment.

Fig. 4 is a detailed cross-sectional view as taken on the line 4—4 of Fig. 1.

The saw table is of generally conventional form and comprises a table top 5 which has a front edge 6, and a guide bar 7 along the rear edge. Also, conventionally, a cut-off saw, abrasive wheel, or other similar cutter 8 is associated with the table to perform a transverse cut on a plank, bar, or other elongated member positioned on the table against the bar 7. The cutting operation is performed by movement of the saw toward the front edge of the table by means of handle 9 on the frame 10, which mounts saw 8. The saw is rotated through the medium of a chain 11 from any suitable prime mover.

The conventional cut-off table above described is provided with the gauge means 12 according to this invention. Said means comprises, generally, a longitudinal element 13 mounted along the front edge 6 of table 5; a longitudinal graduated bar 14 disposed within the element 13 for longitudinal movement therealong; a transverse adjustable gauge arm 15 carried by bar 14; an adjustable stop 16 on the end of said arm; cam means 17 carried by bar 14 at each end thereof and engaged with element 13 for effecting frictional wedging engagement of bar 14 and element 13; a manually operable handle bar 18 longitudinally coextensive with bar 14 and connecting the cam means 17, which serves to hold the latter in bar-wedging position, and which is adapted to be lifted to effect wedging release; and locking means 19 for the bar 14 in adjusted position, said means also serving as an index from which point the adjusted position of the gauge is read.

As illustrated, the element 13 comprises an upwardly facing channel which is secured to the table 5, along its front edge 6, by means such as screws 20. These screws comprise the only securing means for the gauge means which, therefore, is quickly and easily mounted in position and as easily dismounted. The element 13 may be a channel of single length or may comprise two or more shorter lengths mounted in end-to-end abutment.

The bar 14 is formed of square tubing 21, which, in this instance, has end plugs 22. The bar 14, therefore, is light in weight yet strong for the purpose intended. The transverse dimension of the bar is such that it is freely slidable in channel 13 and is simply dropped in place therein. Suitable graduations shown at 23, are applied to the top face of bar 14. Inch graduations are shown and have been exaggerated for clarity. The length of bar 14 is proportioned to that of channel 13 so that it resides in the latter in all adjusted positions.

The gauge arm 15 is secured to one end of bar 14 to extend across the table top 5. Said arm comprises a fixed member 24, secured by studs 25 to bar 14, and a transversely adjustable member 26 which has a longitudinal slot 27 co-operating with spaced lock screws 28 carried by member 24, whereby member 26 can be adjusted extensibly to bring the stop 16 thereon where desired with relation to the guide bar 17.

Stop 16 is also adjustable, but merely to coordinate the assembly and once locked in adjusted position, is not disturbed unless some change occurs in the relationship between the saw 8 and the index edge 29 of the locking means 19. A lug 30 on the member 26 threadedly mounts the stop and a lock nut 31 locks the latter in adjusted position.

The cam means 17 is shown as comprising an eccentric disc 32 on each end of bar 14 and secured for rotation on studs 33 in the end plugs 22 of the bar.

The cam discs 32 are normally weighted by the handle bar 18 to assume the position of Fig. 2 where they wedge against the flange 34 of channel 13 and, thereby effect a reactive pressure of said bar against the other flange 35 of said channel. The bar 18 which, also, may comprise a tubular member, with or without plugged ends, is generally longitudinally co-extensive with bar 14 and is connected to the cam discs 32 by arms 36 which are suitably bent to avoid engagement with channel 13. It will be evident that the pendent position of the bar 18 effects locking of bar 14 against longitudinal movement and that by raising said bar 18, as in Fig. 3, the cam discs are released from engagement with channel flange 34 to free bar 14. Longitudinal adjustable movement of the latter bar and, consequently, of the gauge stop can be readily effected. By dropping bar 18, the gauge is again automatically locked in adjusted position.

The lock means 19 is provided to obviate inadvertent shifting from adjustment, of the gauge, as may be caused by vibration and outside shocks. By locating said means with specific relation to the saw 8, the edge 29 thereof can serve as the index or pointer read in connection with graduations 23. Thus, as shown, the 7" reading of the bar 14 indicates a seven inch spacing between the saw and the stop 16. The means 19 simply comprises a plate 37 extending across the channel 13, a block 38 connected thereto and preferably fixed to the flange 34 of said channel, and a lock screw 39 engaged in a tapped hole through said block and flange and adapted to impinge on bar 14 as best seen in Fig. 4.

It will be evident that adjustment of the gauge may be effected from any position along the front of the table; that said adjustment is easily accomplished by first loosening the screw 39 then raising bar 18 and sliding the same to bring the desired dimension graduation into register with plate edge 27; and that dropping bar 18 and re-setting screw 39, will hold the gauge in adjusted position.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A gauge for cut-off saw tables and the like, comprising an upwardly facing channel along the front edge of the table, a graduated elongated member freely slidable within said channel for adjustment therealong, a gauge arm carried by the elongated member and extending transversely of the table, an adjustable work stop on the gauge arm, and gravity-weighted means comprising elements carried by and at the ends of said elongated member and within the channel for effecting releasable frictional engagement of said elements and an inner face of the channel.

2. A gauge for cut-off saw tables and the like, comprising an upwardly facing channel along the front edge of the table, a graduated elongated member freely slidable within said channel for adjustment therealong, a gauge arm carried by the elongated member and extending transversely of the table, means adapting said arm for extensible adjustment, and gravity-weighted means comprising elements carried by and at the ends of said elongated member and within the channel for effecting releasable frictional engagement of said elements and an inner face of the channel.

3. A gauge for cut-off saw tables and the like, comprising an upwardly facing channel along the front edge of the table, a graduated elongated member freely slidable in said channel for adjustment therealong, a gauge arm having a stop carried by the elongated member and extending transversely of the table, and gravity-weighted means carried by said elongated member for effecting releasable frictional engagement of the latter and the channel, said latter means comprising cam elements on the ends of the elongated member, and a weight for moving said cam elements into engagement with the channel to exert a reactive pressure of the elongated member against an opposed portion of said channel.

4. A gauge for cut-off saw tables and the like comprising an upwardly facing channel along the front edge of the table, a graduated elongated member freely slidable in said channel for adjustment therealong, a gauge arm having a stop carried by the elongated member and extending transversely of the table, and gravity-weighted means carried by said elongated member for effecting releasable frictional engagement of the latter and the channel, said latter means comprising cam elements on the ends of the elongated member, and a bar generally co-extensive with the elongated member and connected with said cam elements to move them into engagement with the channel to exert a reactive pressure of the elongated member against an opposed portion of said channel.

5. A gauge for cut-off saw tables and the like comprising, an upwardly facing channel along the front edge of the table, a graduated elongated member freely slidable within said channel for adjustment therealong, a gauge arm carried by the elongated member and extending transversely of the table gravity-weighted means comprising elements carried by and at the end of said elongated member and within the channel for effecting releasable frictional engagement of said elements and an inner face of the channel, and means carried by said channel for locking the elongated member in adjusted position, said latter means including a member having an edge associated with the graduations of the elongated member whereby the adjusted position of the gauge is determined.

6. In a gauge structure, a fixed longitudinal upwardly facing channel, a shorter graduated elongated member disposed in said channel and freely movable therealong, and gravity actuated means carried by said elongated member and normally having engagement with one flange of the channel to exert a reactive pressure between said elongated member and the opposed flange of the channel, said latter means comprising pivoted cam discs on the ends of the elongated member and a weighted handle bar connecting the cam disc.

7. In a gauge structure, a fixed longitudinal upwardly facing channel, a shorter graduated elongated member disposed within said channel and freely movable therealong, a rotatable element carried on each end of said elongated member and within said channel, and gravity-weighted means connecting the rotatable elements to normally urge them in a direction to engage the inner face of one flange of the channel to exert a reactive pressure between the elongated member and the inner face of the opposite flange of said channel.

EUGENE A. SNOW.

REFERENCES CITED

The following references are of record in the file of this patent:

UNITED STATES PATENTS

| Number | Name | Date |
| --- | --- | --- |
| 112,861 | Sprague | Mar. 21, 1871 |
| 221,804 | Gordon | Nov. 18, 1879 |
| 305,563 | Baer | Sept. 23, 1884 |
| 378,939 | Seymour | Mar. 6, 1888 |
| 1,574,445 | Robinson | Feb. 23, 1926 |
| 1,686,246 | Murner | Oct. 2, 1928 |
| 1,789,125 | Wilderson | Jan. 13, 1931 |
| 1,790,288 | Tautz | Jan. 27, 1931 |
| 2,101,709 | Hedgpeth | Dec. 7, 1937 |
| 2,166,703 | Boice | July 18, 1939 |
| 2,265,335 | Aumann | Dec. 9, 1941 |
| 2,267,937 | Mattison | Dec. 30, 1941 |
| 2,310,813 | Sellmeyer | Feb. 9, 1943 |